3,033,781
CORROSION INHIBITOR
Charles O. Hoover, P.O. Box 4294, Corpus Christi, Tex.
No Drawing. Filed Nov. 12, 1959, Ser. No. 852,164
12 Claims. (Cl. 208—288)

This invention relates to a process for preventing or inhibiting the corrosion of metallic petroleum refining equipment and to compositions employed in said process. In particular, it concerns an improvement in the corrosion inhibiting composition and method disclosed in my co-pending application, Serial No. 524,813, filed July 27, 1955, now Patent No. 2,913,406, of which this application is a continuation-in-part.

Most crude petroleums contain numerous naturally occuring constituents and impurities which will cause severe corrosion of the metals from which conventional petroleum refining equipment is constructed. These corrosive or corrosion-causing materials include acidic materials such as hydrogen sulfide, carbon dioxide and organic acids. Oxygen, which is often present, usually by reason of air absorbed in or admixed with the petroleum, is a particularly corrosive agent, especially at the temperatures to which the crude petroleum and its fractions are subjected during heating and distillation. Salt water or brine (which is commonly produced with, and is usually present in most crude oils) and salts, such as magnesium chloride, contained in the brine, will hydrolyze or otherwise decompose during the heating and distillation processes to form hydrochloric acid, which, in the presence of water vapor and liquid water as found in equipment such as condensers, will cause severe metallic corrosion. Also, mercaptans and other sulfur compounds, normally present in varying amounts in different types of crude petroleums, will decompose during heating and distillation to form corrosive compounds including, particularly, hydrogen sulfide.

Many types of treatment have been employed in attempts to combat such corrosion in petroleum refining systems. None has proven particularly successful in effectively preventing corrosion although some have reduced the rate of corrosion to a point where replacement of equipment may be kept within tolerable limits, although sooner or later major parts of the equipment must be replaced. In the case of high sulfur crude oils, such as Mexican crudes, a high rate of equipment replacement has been accepted as a normal operating condition irrespective of the corrosion-combating processes which have heretofore been employed to protect such equipment.

In the parent case referred to above, there is presented the concept of preparing a concentrated corrosion inhibiting material. This material is referred to therein, and henceforth herein as the "concentrate." This concentrate may be in either solid or liquid form, and the active ingredient thereof comprises an ammoniacal copper complex. The concentrate may be prepared by bubbling carbon dioxide, and ammonia gases simultaneously into water and thereafter adding a commercial copper carbonate to form a copper-ammonium-carbonate complex. Alternatively, the concentrate may be prepared by adding to water a mixture of dry material which, when dissolved, will yield the copper-ammonium-carbonate complex. The complexes, suitable for the purposes of the invention, contain from 4 to 14 weight percent of copper.

Typical "concentrates" as disclosed in my prior patent are the following.

EXAMPLE A

Typical concentrate in liquid form:

|  | Weight percent |
| --- | --- |
| Copper carbonate | 18.5 |
| Ammonia (anhydrous) | 17.8 |
| Ammonia bicarbonate | 13.0 |
| Water | 50.7 |
| Total | 100.0 |

EXAMPLE B

Another liquid concentrate:

|  | Parts by weight |
| --- | --- |
| Copper carbonate | 34 |
| Water | 70 |
| Carbon dioxide | 10 |
| Ammonia | 24 |

In order to use concentrates such as the two exemplified above, they are mixed at ambient temperatures with an aqueous alkaline medium, preferably a solution of $Na_2CO_3$, to form what is referred to in this and in my prior patent as a "final treating solution." This final treating solution may also be prepared as a dry mixture requiring only the addition of water to be ready for use. It is obvious that other dry products may be prepared which contain some part, or all, of the alkaline material needed for the final treating solution plus all of the ingredients of the concentrate. Such dry products may be added to an aqueous alkaline medium which is more dilute than that required when concentrates containing more of the alkaline material necessary for the final treating solution are used.

A typical final treating solution may, according to my prior patent, be prepared by dissolving one gallon of a concentrate, such as that illustrated by Example A, in 120 to 130 (preferably 126) gallons of 12° Baumé aqueous sodium carbonate solution. At ambient temperatures (e.g. 25° C.) saturated sodium carbonate solutions contain about 23% $Na_2CO_3$. A typical dry form of final treating solution, requiring only dilution with water prior to use is that exemplified below.

EXAMPLE C

Dry form of final treating solution:

|  | Weight percent |
| --- | --- |
| Ammonium bicarbonate | 5.0 |
| Copper carbonate | .5 |
| Sodium carbonate | 94.5 |
| Total | 100.0 |

Other examples of final treating solutions, which are in liquid form are as follows:

EXAMPLE D

| | Weight percent |
|---|---|
| Copper (as metal) | 0.027 |
| Ammonia | 0.032 |
| Carbon dioxide | 0.023 |
| Sodium carbonate | 10.020 |
| Water | 89.898 |
| Total | 100.000 |

EXAMPLE E

| | Weight percent |
|---|---|
| Copper (as metal) | 0.125 |
| Ammonia | 0.148 |
| Carbon dioxide | 0.108 |
| Sodium carbonate | 10.000 |
| Water | 89.619 |
| Total | 100.000 |

EXAMPLE F

| | Weight percent |
|---|---|
| Copper (as metal) | 1.144 |
| Ammonia | 1.358 |
| Carbon dioxide | 0.990 |
| Sodium carbonate | 8.340 |
| Water | 88.168 |
| Total | 100.000 |

Various alternative concentrates and final treating solutions are discussed in the parent case and it is obvious, as discussed therein, that many equivalent chemical reactions can be relied upon in preparation of either. Furthermore, the "concentrate," particularly when in solid form, may contain various other ingredients required in the ultimate formulation of the final treating solution. In fact, in the extreme case such as shown by Example C above, the concentrate may be merely a dehydrated final treating solution which requires only the addition of water to be available for immediate use.

It has now been found that the storage life of the final treating solutions of the parent case at elevated temperatures, particularly those above 90° F. (e.g. 120° F., 150° F. and 212° F.) can be lengthened. During such prolonged storage, there may be precipitation of metallic copper or copper oxide from the final treating solution, thus causing the copper concentration in the remaining supernatant liquid to be below that required for effective operation in accordance with my original invention. Such copper precipitation can now be prevented.

Accordingly, it is an object of this invention to provide an improved corrosion inhibiting composition, the active ingredient of which is a copper ammonium carbonate complex, which is chemically stable at temperatures above 90° F.

A further object of this invention is to provide a chemical composition from which copper does not precipitate at elevated temperatures.

Still another object of this invention is to provide a method of preparing a treating composition which is temperature stable above 90° F.

An additional object of this invention is to provide a process for combating corrosion of petroleum refining equipment by adding to the crude petroleum, at it enters the refining system, a chemical composition adapted to effectively neutralize or inhibit the various corrosion causing constituents in the crude petroleum, which composition is chemically stable during storage at temperatures above 90° F.

These and additional objects of the invention will be apparent to those skilled in the art from a consideration of the specification and claims which follow.

Briefly stated, it has been found that final treating solutions such as the composition described in my parent case and referred to hereinabove may be stabilized by the addition of small amounts of sodium bicarbonate ($NaHCO_3$). The amount of $NaHCO_3$ used (in pounds per gallon of final treating solution) and the temperature to which the final treating solution will be stable are directly proportional.

In the following discussion, concerning the amount of sodium bicarbonate required to stabilize final treating solutions, it should be appreciated that the numerical values are given on the assumption that the aqueous alkaline solution was prepared using reagent sodium carbonate. Actually the sodium carbonate of commerce or soda ash, when exposed while stored in bulk or in multi-walled bags, absorbs moisture and carbon dioxide from the air. There is thus formed the more stable sodium sesqui-carbonate ($Na_2CO_3 \cdot NaHCO_3 \cdot 2H_2O$). Thus, it is seen that such commercial materials already contain sodium bicarbonate and will, accordingly, by virtue of the sodium bicarbonate already present, yield treating solutions which are more stable than treating solutions made with pure sodium carbonate. Accordingly, the numerical values discussed below will be stoichiometrically different (i.e. amount of sodium bicarbonate required decreases) when commercial grade material has been used. It is also apparent that one starting with reagent grade sodium carbonate may, by the addition of carbon dioxide to the solution, impart a certain degree of stability to final treating solutions.

Turning now to a consideration of the use of sodium bicarbonate in treating solutions prepared with sodium carbonate, we find that the amount of bicarbonate required to produce stability to a fixed temperature is a function only of the concentration of the sodium carbonate solution originally used in the preparation of the final treating solution. As shown in Table I (which appears in column 5) the volume of sodium carbonate solution, of a fixed concentration, used per volume of concentrate had no effect upon the gallons of final treating solution which could be stabilized by one pound of sodium bicarbonate. Reviewing the data in the tables it will be seen that for a 10% solution of sodium carbonate amounts over 0.0166 pound of sodium bicarbonate per pound of sodium carbonate produce stability at 120° F.; amounts over 0.0377 (pound per pound) produce stability at 150° F., and amounts over 0.137 (pound per pound) produce stability at 212° F. For a 15% sodium carbonate solution comparable values are 0.0198 at 120° F., 0.0204 at 150° F. and 0.0632 at 212° F. Finally, for a 20% sodium carbonate solution (which gives treating solutions inherently stable at 120° F.) the comparable values are 0.0106 at 150° F. and 0.0384 at 212° F.

The data tabulated in Table I demonstrate the effect of adding sodium bicarbonate to final treating solutions. The series of experiments reflected in the tabulation were performed with final treating solution made with the concentrate of Example A of the instant application. To this concentrate was added sodium carbonate solution of the concentration shown in column 1. In each instance, 2 samples were prepared at 2 different dilutions (i.e. volume of sodium carbonate solution per volume of concentrate). The dilution ratios appear in column 2 and each line of column 2 has two different ratios since two different experiments were performed. Column 3 indicates the number of gallons of final treating solution used per pound of sodium bicarbonate and column 4 expresses the same data as pounds of sodium bicarbonate per pound of sodium carbonate. The last 3 columns indicate whether there was any precipitate from either of the 2 samples at temperatures of 120° F., 150° F. and 212° F.

The minimum amount of sodium bicarbonate which is usually necessary to produce the desired increased stability may be calculated by a family of equations (one member of the family being used for each of the three temperature conditions) which relate the percent concentration of the sodium carbonate solution used in the preparation of final treating solutions to the pounds of sodium bicarbonate required per pound of sodium carbonate. The use of excess sodium bicarbonate above Table I—Stabilization of Final Treating Solutions

| Concentration of Sodium Carbonate Solution Used, percent | Volumes of Sodium Carbonate Solution Per Volume of Concentrate | Gallons of Final Treating Solution Per Lb. Sodium Bicarbonate | Pounds of Sodium Bicarbonate Per Lb. Sodium Carbonate | Precipitates After 24 hours at | | |
|---|---|---|---|---|---|---|
| | | | | 120° F. | 150° F. | 212° F. |
| 10 | 29 and 144 | 8 | 0.137 | No | No | No |
| 10 | 29 and 144 | 9 | 0.122 | No | No | Yes |
| 10 | 29 and 144 | 29 | 0.0377 | No | No | Yes |
| 10 | 29 and 144 | 30 | 0.0365 | No | Yes | Yes |
| 10 | 29 and 144 | 66 | 0.0166 | No | Yes | Yes |
| 10 | 29 and 144 | 67 | 0.0163 | Yes | Yes | Yes |
| 15 | 89 and 178 | 11 | 0.0632 | No | No | No |
| 15 | 89 and 178 | 12 | 0.0579 | No | No | Yes |
| 15 | 89 and 178 | 34 | 0.0204 | No | No | Yes |
| 15 | 89 and 178 | 35 | 0.0198 | No | Yes | Yes |
| 15 | 89 and 178 | None | | T.P. | Yes | Yes |
| 20 | 131 and 262 | 13 | 0.0384 | No | No | No |
| 20 | 131 and 262 | 14 | 0.0357 | No | No | Yes |
| 20 | 131 and 262 | 47 | 0.0106 | No | No | Yes |
| 20 | 131 and 262 | 48 | 0.0104 | No | Yes | Yes |
| 20 | 131 and 262 | None | | No | Yes | Yes |

T.P.—Transition Point, some inherent stability.

this minimum does not adversely affect the invention. Larger amounts may be used up to the limit of solubility of sodium bicarbonate in the final treating solution. The important operating requirement is that the minimum amount of sodium bicarbonate, as given by the appropriate equation be present. Final treating solutions meeting this requirement will be temperature stable to the temperature indicated:

A. For temperature stability to 120° F.—

$$Y = \frac{15-X}{301}$$

B. For temperature stability to 150° F.—

$$Y = \frac{23.9-X}{369}$$

C. For temperature stability to 212° F.—

$$Y = \frac{23.9-X}{101.4}$$

In all of the above equations $Y$ = the pounds of sodium bicarbonate per pound of sodium carbonate required in the final treating solution so as to make the solution temperature stable to the temperature indicated. $X$ = the weight percent of $Na_2CO_3$ in the aqueous alkaline medium used in preparing the final treating solution.

Treating solutions made with sodium carbonate solutions more concentrate than 15% are stable, without the addition of bicarbonate, to at least 120° F. and therefore Equation A above should not be used where X is greater than 15. In Equations B and C the upper limit of X (i.e. 23.9) is a function of the solubility of sodium carbonate and the equations therefore cover all practical operating conditions.

Having described my invention, what is claimed is:

1. A method of inhibiting corrosion in metallic petroleum distillation apparatus which comprises admixing with petroleum being distilled in said apparatus a final treating solution stable to a temperature of 120° F. comprising aqueous sodium carbonate said weight percent being less than 15 solution having a concentration of "X" weight percent sodium carbonate, an ammoniacal copper carbonate complex and sodium bicarbonate, the pounds of sodium bicarbonate present in said final treating solution for each pound of sodium carbonate being at least as great as the quantity $$\frac{15-X}{301}$$

2. The method of protecting metallic petroleum distillation apparatus from corrosion by corrosive constituents contained in crude petroleum processed in said apparatus which comprises admixing with crude petroleum in liquid phase as it enters said apparatus a final treating solution stable to a temperautre of 120° F. comprising aqueous sodium carbonate solution having a concentration of "X" weight percent sodium carbonate said weight percent being less than 15, an ammoniacal copper carbonate complex, and sodium bicarbonate, the pounds of sodium bicarbonate present in said final treating solution for each pound of sodium carbonate being at least as great as the quantity $$\frac{15-X}{301}$$

and subjecting the resulting admixture to distillation in said apparatus.

3. A chemical composition for inhibiting corrosion of metallic petroleum refining apparatus by corrosive constituents contained in the petroleum processed in said apparatus comprising aqueous sodium carbonate solution having a concentration of "X" weight percent sodium carbonate said weight percent being less than 15, an ammoniacal copper carbonate complex and sodium bicarbonate, the pounds of sodium bicarbonate present in said composition for each pound of sodium carbonate being at least as great as the quantity $$\frac{15-X}{301}$$

said composition being stable to a temperature of 120° F.

4. A chemical composition, stable to a temperature of 120° F., for inhibiting corrosion of metallic petroleum distillation apparatus by corrosive constituents contained in the petroleum processed in said apparatus comprising water; copper carbonate; ammonia; a member of the group consisting of ammonium carbonate and ammonium bicarbonate; sodium carbonate and sodium bicarbonate, the pounds of sodium bicarbonate present in said composition for each pound of sodium carbonate being at least as great as the quantity $$\frac{15-X}{301}$$

where X equals the weight percent of the aqueous sodium carbonate solution used in the preparation of said composition, said weight percent being less than 15.

5. A method of inhibiting corrosion in metallic petroleum distillation apparatus which comprises admixing with petroleum being distilled in said apparatus a final treating solution stable to a temperature of 150° F. comprising aqueous sodium carbonate solution having a concentration of "X" weight percent sodium carbonate said weight percent being less than 23.9, an ammoniacal copper carbonate complex and sodium bicarbonate, the pounds of sodium bicarbonate present in said final treating solution for each pound of sodium carbonate being at least as great as the quantity $$\frac{23.9-X}{369}$$

6. The method of protecting metallic petroleum distillation apparatus from corrosion by corrosive constituents contained in crude petroleum processed in said apparatus which comprises admixing with crude petroleum in liquid phase as it enters said apparatus a final treating solution stable to a temperature of 150° F. comprising aqueous sodium carbonate solution having a concentration of "X" weight percent sodium carbonate said weight percent being less than 23.9, an ammoniacal copper carbonate complex, and sodium bicarbonate, the pounds of sodium bicarbonate present in said final treating solution for each pound of sodium carbonate being at least as great as the quantity $$\frac{23.9-X}{369}$$

and subjecting the resulting admixture to distillation in said apparatus.

7. A chemical composition, stable to a temperature of 150° F., for inhibiting corrosion of metallic petroleum refining apparatus by corrosive constituents contained in the petroleum processed in said apparatus comprising aqueous sodium carbonate solution having a concentration of "X" weight percent sodium carbonate said weight percent being less than 23.9, an ammoniacal copper carbonate complex and sodium bicarbonate, the pounds of sodium bicarbonate present in said composition for each pound of sodium carbonate being at least as great as the quantity $$\frac{23.9-X}{369}$$

8. A chemical composition, stable to a temperature of 150° F. for inhibiting corrosion of metallic petroleum distillation apparatus by corrosive constituents contained in the petroleum processed in said apparatus comprising water; copper carbonate; ammonia; a member of the group consisting of ammonium carbonate and ammonium bicarbonate; sodium carbonate and sodium bicarbonate, the pounds of sodium bicarbonate present in said composition for each pound of sodium carbonate being at least as great as the quantity $$\frac{23.9-X}{369}$$

where X equals the weight percent of sodium carbonate in the aqueous solution used in the preparation of said composition said weight percent being less than 23.9.

9. A method of inhibiting corrosion in metallic petroleum distillation apparatus which comprises admixing with petroleum being distilled in said apparatus a final treating solution stable to a temperature of 212° F. comprising aqueous sodium carbonate solution having a concentration of "X" weight percent sodium carbonate, said weight percent being less than 23.9, an ammoniacal copper carbonate, complex and sodium bicarbonate, the pounds of sodium bicarbonate present in said final treating solution for each pound of sodium carbonate being at least as great as the quantity $$\frac{23.9-X}{101.4}$$

10. The method of protecting metallic petroleum distillation apparatus from corrosion by corrosive constituents contained in crude petroleum processed in said apparatus which comprises admixing with crude petroleum in liquid phase as it enters said apparatus a final treating solution stable to a temperature of 212° F. comprising aqueous sodium carbonate solution having a concentration of "X" weight percent sodium carbonate, said weight percent being less than 23.9, an ammoniacal copper carbonate complex, and sodium bicarbonate, the pounds of sodium bicarbonate present in said final treating solution for each pound of sodium carbonate being at least as great as the quantity $$\frac{23.9-X}{101.4}$$

and subjecting the resulting admixture to distillation in said apparatus.

11. A chemical composition, stable to a temperature of 212° F. for inhibiting corrosion of metallic petroleum refining apparatus by corrosive constituents contained in the petroleum processed in said apparatus comprising aqueous sodium carbonate solution having a concentration of "X" weight percent sodium carbonate, said weight percent being less than 23.9, an ammoniacal copper carbonate complex and sodium bicarbonate, the pounds of sodium bicarbonate present in said composition for each pound of sodium carbonate being at least as great as the quantity $$\frac{23.9-X}{101.4}$$

12. A chemical composition, stable to a temperature of 212° F. for inhibiting corrosion of metallic petroleum distillation apparatus by corrosive constituents contained in the petroleum processed in said apparatus comprising water; copper carbonate; ammonia; a member of the group consisting of ammonium carbonate and ammonium bicarbonate; sodium carbonate and sodium bicarbonate, the pounds of sodium bicarbonate present in said composition for each pound of sodium carbonate being at least as great as the quantity $$\frac{23.9-X}{101.4}$$

where X equals the weight percent of the aqueous sodium carbonate solution used in the preparation of said composition, said weight percent being less than 23.9.

References Cited in the file of this patent
UNITED STATES PATENTS
2,913,406    Hoover _____ Nov. 17, 1959

UNITED STATES PATENT OFFICE
CERTIFICATE OF CORRECTION

Patent No. 3,033,781              May 8, 1962

Charles O. Hoover

It is hereby certified that error appears in the above numbered patent requiring correction and that the said Letters Patent should read as corrected below.

Column 5, lines 66 and 67, strike out "said weight percent being less than 15"; same column, line 68, after "carbonate" insert -- said weight percent being less than 15 --.

Signed and sealed this 28th day of August 1962.

(SEAL)
Attest:

ESTON G. JOHNSON
Attesting Officer

DAVID L. LADD
Commissioner of Patents